(12) United States Patent
Masuko

(10) Patent No.: US 10,354,285 B2
(45) Date of Patent: Jul. 16, 2019

(54) INFORMATION PROVISION DEVICE

(71) Applicant: Rakuten, Inc., Shinagawa-ku, Tokyo (JP)

(72) Inventor: Soh Masuko, Shinagawa-ku (JP)

(73) Assignee: Rakuten, Inc., Tokyo (JP)

(*) Notice: Subject to any disclaimer, the term of this patent is extended or adjusted under 35 U.S.C. 154(b) by 1123 days.

(21) Appl. No.: 14/389,035

(22) PCT Filed: Oct. 16, 2012

(86) PCT No.: PCT/JP2012/076720
§ 371 (c)(1),
(2) Date: Sep. 29, 2014

(87) PCT Pub. No.: WO2013/145396
PCT Pub. Date: Oct. 3, 2013

(65) Prior Publication Data
US 2015/0019346 A1    Jan. 15, 2015

(30) Foreign Application Priority Data

Mar. 30, 2012  (JP) .................................. 2012-079853

(51) Int. Cl.
*G06Q 30/00*   (2012.01)
*G06Q 30/02*   (2012.01)
(Continued)

(52) U.S. Cl.
CPC ....... *G06Q 30/0269* (2013.01); *G06F 16/583* (2019.01); *G06F 16/9535* (2019.01); (Continued)

(58) Field of Classification Search
CPC ........... G06Q 30/0269; G06Q 30/0631; G06Q 50/01; G06Q 50/0643; G06Q 30/0643; G06F 16/9535; G06F 16/583
(Continued)

(56) References Cited

U.S. PATENT DOCUMENTS

2002/0049649 A1*  4/2002  Kubota .............. G06Q 30/0203
                                                                    705/26.3
2002/0065735 A1   5/2002  Hatakama et al.
(Continued)

FOREIGN PATENT DOCUMENTS

JP    2002-74166 A    3/2002
JP    2002-163503 A   6/2002
(Continued)

OTHER PUBLICATIONS

English Translation of International Preliminary Report on Patentability dated Oct. 9, 2014 issued in Patent Application No. PCT/JP2012/076720.
International Search Report dated Jan. 15, 2013 in Application No. PCT/JP2012/076720.

*Primary Examiner* — Jason B Dunham
*Assistant Examiner* — Anand R Loharikar
(74) *Attorney, Agent, or Firm* — Sughrue Mion, PLLC

(57) ABSTRACT

An information provision device includes a reception unit that receives a display request for a product from a terminal of a user; an access-history acquisition unit that refers to an access-history storage unit that stores therein an access history indicating a purchase history or a viewing history of a product, and identifies a product that the user has ever purchased or viewed; an image extraction unit that extracts an image containing the product indicated by the display request and the product identified by the access-history acquisition unit from an image storage unit that stores therein a product combination image; and a transmission unit that transmits information including the image extracted by the image extraction unit to the terminal.

13 Claims, 15 Drawing Sheets

(51) Int. Cl.
*G06Q 30/06* (2012.01)
*G06Q 50/00* (2012.01)
*G06F 16/9535* (2019.01)
*G06F 16/583* (2019.01)

(52) U.S. Cl.
CPC ..... *G06Q 30/0631* (2013.01); *G06Q 30/0643* (2013.01); *G06Q 50/01* (2013.01)

(58) Field of Classification Search
USPC .............................................. 705/26.1–27.2
See application file for complete search history.

(56) References Cited

U.S. PATENT DOCUMENTS

2008/0212899 A1* 9/2008 Gokturk ............ G06F 17/30259
382/305
2009/0313142 A1* 12/2009 Hiruma ................ G06Q 10/087
705/28

FOREIGN PATENT DOCUMENTS

| JP | 2002-197298 A | 7/2002 |
| JP | 2002-339135 A | 11/2002 |
| JP | 2004-310755 A | 11/2004 |
| JP | 2008-71271 A | 3/2008 |
| JP | 2009-301297 A | 12/2009 |

* cited by examiner

Fig. 4

PURCHASE HISTORY INFORMATION

| PURCHASE HISTORY ID | PRODUCT ID | PRODUCT NAME | USER ID |
|---|---|---|---|
| B001 | M003 | SHIRT A | U001 |
| B002 | M004 | PANTS A | U001 |
| B003 | M001 | SHOES B | U002 |
| B004 | M005 | COAT A | U003 |
| B005 | M002 | WATCH B | U004 |
| B006 | M006 | BAG A | U002 |
| ... | ... | ... | ... |

Fig. 5

IMAGE INFORMATION

| IMAGE ID | PRODUCT ID | PRODUCT ID | PRODUCT ID |
|---|---|---|---|
| P001 | M003 | M002 | M001 |
| P002 | M004 | M002 | M001 |
| P003 | M008 | M004 | M002 |
| P004 | M003 | M004 | M006 |
| P005 | M003 | M006 | M007 |
| P006 | M007 | M005 | M004 |
| ... | ... | ... | ... |

Fig. 10

COMMENT INFORMATION

| COMMENT ID | COMMENT | IMAGE | PRODUCT ID | PRODUCT ID | PRODUCT ID | USER ID |
|---|---|---|---|---|---|---|
| C001 | I BOUGHT COAT A IN NAVY. I COORDINATED IT WITH PANTS B THAT I HAD PREVIOUSLY BOUGHT... | IMAGE A | M001 | M002 | M005 | U004 |
| C002 | LENGTH WAS TOO LONG FOR ME AT 150 CM TALL... | IMAGE B | M001 | M004 | M005 | U005 |
| ... | ... | ... | ... | ... | ... | ... |

Fig. 14

USER INFORMATION

| USER ID | HEIGHT | WEIGHT | SEX |
|---|---|---|---|
| U001 | 185 | 65 | MALE |
| U002 | 165 | 80 | MALE |
| U003 | 160 | 50 | FEMALE |
| U004 | 155 | 45 | FEMALE |
| ... | ... | ... | ... |

Fig. 15

USER INFORMATION

| IMAGE ID | PRODUCT ID | PRODUCT ID | PRODUCT ID | HEIGHT | WEIGHT | SEX |
|---|---|---|---|---|---|---|
| P001 | M003 | M002 | M001 | 180 | 70 | MALE |
| P002 | M004 | M002 | M001 | 185 | 65 | MALE |
| P003 | M008 | M004 | M002 | 160 | 50 | FEMALE |
| P004 | M003 | M004 | M006 | 180 | 60 | MALE |
| P005 | M003 | M006 | M007 | 180 | 70 | MALE |
| P006 | M007 | M005 | M004 | 180 | 60 | MALE |
| ... | ... | ... | ... | ... | ... | ... |

INFORMATION PROVISION DEVICE

CROSS REFERENCE TO RELATED APPLICATIONS

This application is a National Stage of International Application No. PCT/JP2012/076720 filed Oct. 16, 2012, claiming priority based on Japanese Patent Application No. 2012-079853 filed Mar. 30, 2012, the contents of all of which are incorporated herein by reference in their entirety.

TECHNICAL FIELD

One embodiment of the present invention relates to a device, a method, and a program for providing information useful for users browsing for products, and also a computer-readable recording medium for recording the program.

BACKGROUND ART

Conventionally, techniques for providing an image of another product related to a product selected by a user to the user in order to encourage the user to purchase the product have been known. For example, Patent Literature 1 discloses a technique for an online shopping mall in which when a user has purchased a product, other products such as shoes, a hat, and a bag that are registered in advance and match the product are introduced, whereby the purchase of the other products is promoted.

CITATION LIST

Patent Literature

[Patent Literature 1] Japanese Patent Application Laid-Open Publication No. 2002-74166

SUMMARY OF INVENTION

Technical Problem

Users have their own preferences in terms of combinations of products (e.g., coordinates of clothes and accessories). In the technique described in Patent Literature 1, however, combinations of products provided to a user are limited to those that are determined in advance; thus the combinations provided do not match the preference of the user, so that the user may lose motivation to purchase the products. Furthermore, in this technique, it is difficult to provide a user with an impression when the user uses products in combination in which the user is interested.

Accordingly, providing such an image that can present the impression when the user uses the products is demanded.

Solution to Problem

An information provision device according to one embodiment of the present invention includes a reception unit that receives a display request for a product from a terminal of a user; an access-history acquisition unit that refers to an access-history storage unit that stores therein an access history indicating a purchase history or a viewing history of a product, and identifies a product that the user has ever purchased or viewed; an image extraction unit that extracts an image containing the product indicated by the display request and the product identified by the access-history acquisition unit from an image storage unit that stores therein a product combination image; and a transmission unit that transmits information including the image extracted by the image extraction unit to the terminal.

An information provision method according to one embodiment of the present invention includes a reception step of receiving a display request for a product from a terminal of a user; an access-history acquisition step of referring to an access-history storage unit that stores therein an access history indicating a purchase history or a viewing history of a product, and identifying a product that the user has ever purchased or viewed; an image extraction step of extracting an image containing the product indicated by the display request and the product identified at the access-history acquisition step from an image storage unit that stores therein a product combination image; and a transmission step of transmitting information including the image extracted at the image extraction step to the terminal.

An information provision program according to one embodiment of the present invention causes a computer to function as a reception unit that receives a display request for a product from a terminal of a user; an access-history acquisition unit that refers to an access-history storage unit that stores therein an access history indicating a purchase history or a viewing history of a product, and identifies a product that the user has ever purchased or viewed; an image extraction unit that extracts an image containing the product indicated by the display request and the product identified by the access-history acquisition unit from an image storage unit that stores therein a product combination image; and a transmission unit that transmits information including the image extracted by the image extraction unit to the terminal.

A computer-readable recording medium for recording an information provision program according to one embodiment of the present invention records an information provision program that causes a computer to function as a reception unit that receives a display request for a product from a terminal of a user; an access-history acquisition unit that refers to an access-history storage unit that stores therein an access history indicating a purchase history or a viewing history of a product, and identifies a product that the user has ever purchased or viewed; an image extraction unit that extracts an image containing the product indicated by the display request and the product identified by the access-history acquisition unit from an image storage unit that stores therein a product combination image; and a transmission unit that transmits information including the image extracted by the image extraction unit to the terminal.

In these embodiments, an image containing the product indicated by the display request and the product identified by the access-history acquisition unit is extracted, and the image thus extracted is transmitted to the terminal of the user. The product that the user of the terminal purchased or viewed in the past is assumed to be a product in which the user is interested. Accordingly, presenting the image containing the product indicated by the display request and the product identified by the access-history acquisition unit to the user can present the impression when products in which the user is interested are combined, so that purchase motivation of the user can be increased.

In the information provision device according to still another embodiment, the image extraction unit may further extract from the image storage unit an image that contains the product indicated by the display request but does not contain the product identified by the access-history acquisition unit, and the image containing the product indicated by the display request and the product identified by the access-history acquisition unit may be displayed on the terminal more conspicuously than the image that contains the product indicated by the display request but does not contain the product identified by the access-history acquisition unit.

In this case, the image that can present the impression when the products in which the user is interested can be displayed conspicuously.

In the information provision device according to still another embodiment, the display request may be a query indicating a search criterion for a product, the image extraction unit may further extract from the image storage unit an image that contains a product satisfying the search criterion but does not contain the product identified by the access-history acquisition unit, and an image containing the product satisfying the search criterion and the product identified by the access-history acquisition unit may be displayed on the terminal more conspicuously than the image that contains the product satisfying the search criterion but does not contain the product identified by the access-history acquisition unit.

In this case, an image that can present the impression when the products in which the user is interested are combined can be displayed conspicuously.

In the information provision device according to still another embodiment, the image storage unit may store therein an image that was posted by another user who is different from the user.

In this case, the image that was posted by the other user can be used as an image to be transmitted to the user, and thus an administrator can save the effort of registering the image in advance.

In the information provision device according to still another embodiment, the image storage unit may store therein an image that was posted in an external internet site by the other user.

In this case, an image that was posted by a person using a computer system on an external network can be used as an image to be transmitted to the user, and thus the administrator can save the effort of registering the image in advance.

The information provision device according to still another embodiment may further include a reward giving unit that gives a certain reward to the other user when a user who has viewed the image that was posted by the other user purchases the product.

In this case, the certain reward is given to the other user, which can encourage the other user to actively post product combination images.

The information provision device according to still another embodiment may further include a notification unit that notifies the user of information on the image containing the product indicated by the display request and the product identified by the access-history acquisition unit when the image has been added into the image storage unit.

In this case, the user can view the image thus added, and thus motivation of the user to purchase the product can be increased.

The information provision device according to still another embodiment may further include a first determination unit that determines whether the image posted by the other user is a wearing-scene image showing a scene in which a using person wears a combination of products and, if the first determination unit determines that the image posted by the other user is not the wearing-scene image, the transmission unit may determine not to transmit the image to the terminal.

In this case, only the image showing the scene in which the using person uses the combination of products, which is information useful for the user to purchase the product, can be transmitted to the user.

The information provision device according to still another embodiment may further include a second determination unit that determines whether feature points of a first reference image showing the product indicated by the display request exist in the image posted by the other user at a certain proportion or more and whether feature points of a second reference image showing the product identified by the access-history acquisition unit exist in the image posted at the certain proportion or more, at the same time. If the second determination unit determines that the respective feature points of the first reference image and the second reference image do not exist in the image posted by the other user at the certain proportion or more, the transmission unit may determine not to transmit the image to the terminal.

In this case, only the image showing the whole of the product, which is information useful for the user to purchase the product, can be transmitted to the user.

In the information provision device according to still another embodiment, when the image containing the product indicated by the display request and the product identified by the access-history acquisition unit does not exist, the image extraction unit may extract a default image that is set for the product indicated by the display request.

In this case, even when the image extraction unit cannot extract the image, an image related to the product can be presented to the user.

The information provision device according to still another embodiment may further include a body-information acquisition unit that acquires physical characteristics of the user, the image storage unit may store therein a product combination image containing information on physical characteristics, and the image extraction unit may extract from the image storage unit an image that contains the product indicated by the display request and the product identified by the access-history acquisition unit and corresponds to the physical characteristics of the user.

In this case, an image that contains the product indicated by the display request and the product identified by the access-history acquisition unit and corresponds to the physical characteristics of the user is extracted. By transmitting such an image that corresponds to the physical characteristics of the user to the terminal, the impression when the user uses the product can be presented to the user, so that purchase motivation of the user can be increased.

Advantageous Effects of Invention

According to one aspect of the present invention, purchase motivation of a user can be increased.

BRIEF DESCRIPTION OF DRAWINGS

FIG. 4 is a diagram illustrating an example of purchase history information.

FIG. 5 is a diagram illustrating an example of image information.

FIG. 10 is a diagram illustrating an example of comment information.

FIG. 14 is a diagram illustrating an example of user information.

FIG. 15 is a diagram illustrating another example of the image information.

DESCRIPTION OF EMBODIMENTS

Embodiments of the present invention will be described below in detail with reference to the attached drawings. The same reference signs are given to the same or similar elements in description of the drawings, and duplicate explanations are omitted.

First Embodiment

Figure 1:
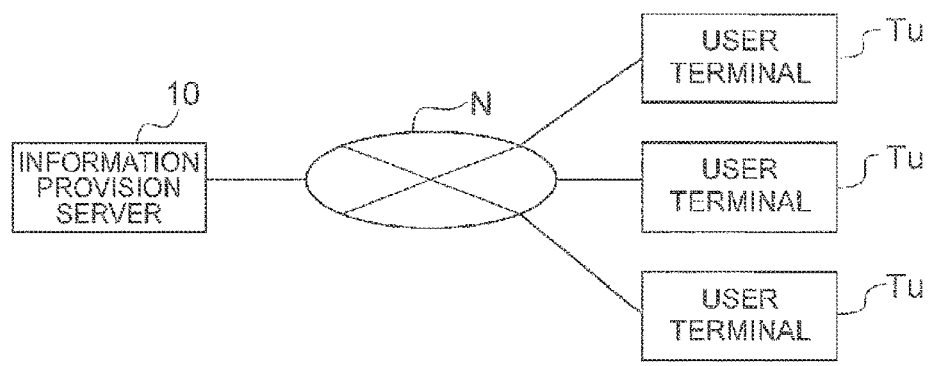
FIG. 1 is a diagram illustrating a whole structure of a system including an information provision server according to a first embodiment.

Functions and a structure of an information provision server (information provision device) 10 according to a first embodiment will now be described with reference to FIGS. 1 to 5. The information provision server 10 is a computer system that, for the purpose of encouraging a user to purchase a product sold at an online shopping site, provides a product combination image to the user. The product combination image is an image showing a scene in which products such as clothes, accessories or pieces of furniture to be used in combination are coordinated. The image herein conceptually includes a still image and a moving image. The following describes a mode in which the information provision server 10 provides an image of coordinated accessories as the product combination image to a user. As depicted in FIG. 1, the information provision server 10 is connected to user terminals Tu via a communication network N.

The user terminals Tu each are a terminal of a person (user) who views a product combination image and possibly purchases a product referring to this information.

In the present embodiment, it is assumed that the two or more user terminals Tu exist, but the number of the user terminals Tu are not limited. The type of the user terminals Tu is not limited, either. For example, the user terminals Tu may be personal computers, personal digital assistants (PDA), or mobile phones.

Figure 2:
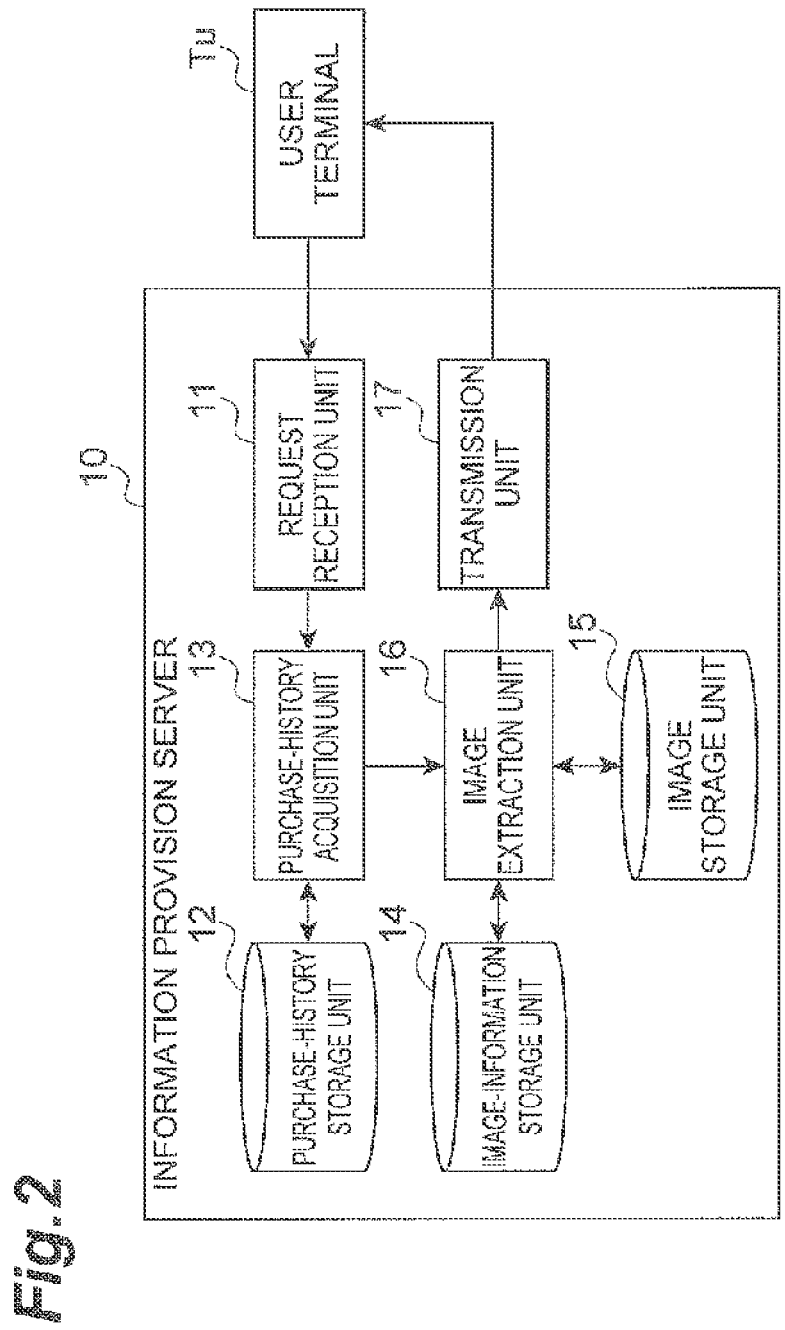
FIG. 2 is a block diagram illustrating a functional structure of the information provision server according to the first embodiment.

As depicted in FIG. 2, the information provision server 10 includes as functional components a request reception unit (reception unit) 11, a purchase-history storage unit (access-history storage unit) 12, a purchase-history acquisition unit (access-history acquisition unit) 13, an image-information storage unit 14, an image storage unit 15, an image extraction unit 16, and a transmission unit 17. The image-information storage unit 14 and the image storage unit 15 correspond to the image storage unit in the claims.

Figure 3:
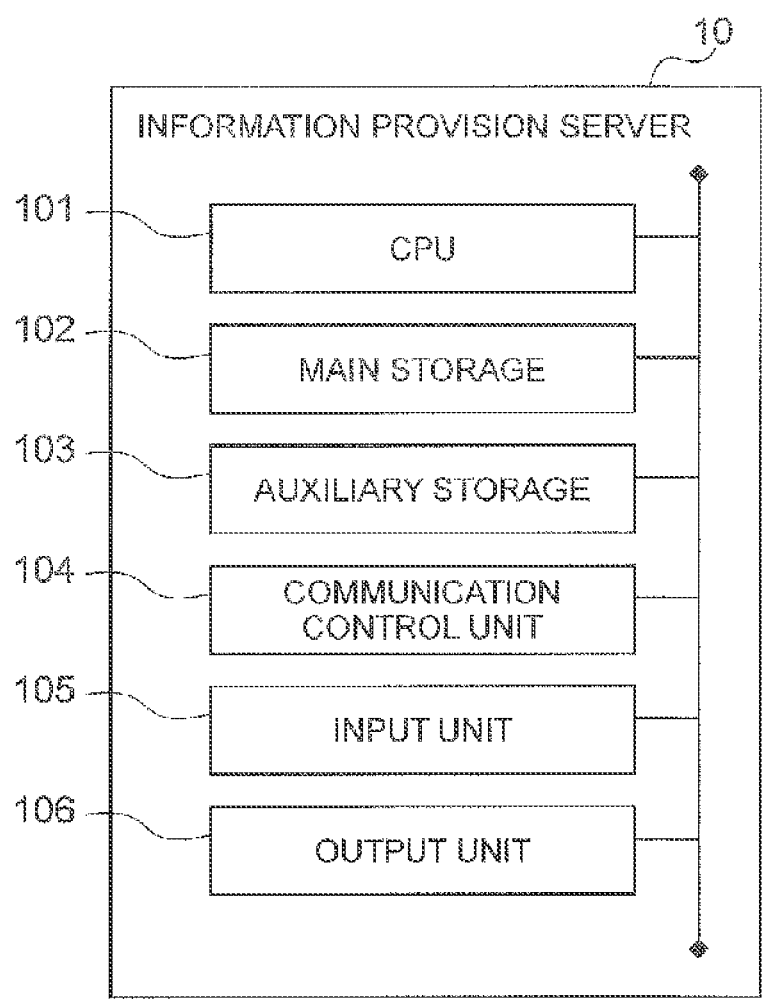
FIG. 3 is a diagram illustrating a hardware structure of the information provision server according to the first embodiment.

As depicted in FIG. 3, this information provision server 10 includes a CPU 101 for executing an operating system and an application program, for example, a main storage 102 including a ROM and a RAM, an auxiliary storage 103 including a hard disk, a communication control unit 104 including a network card, an input unit 105 such as a keyboard and a mouse, and an output unit 106 such as a monitor. Each function depicted in FIG. 2 is implemented by loading certain software into the CPU 101 and the main storage 102, causing the communication control unit 104 and other components, the input unit 105, and the output unit 106, for example, to operate under the control of the CPU 101, and reading and writing data in the main storage 102 and/or the auxiliary storage 103. Data or a database required for the processing is stored in the main storage 102 and/or the auxiliary storage 103.

In FIG. 3, the information provision server 10 seems to be structured with one computer, but the functions of the information provision server 10 may be distributed into a plurality of computers. For example, the information provision server 10 may include a computer having a database function and a computer having the other functions.

The request reception unit 11 receives a display request for an image related to a product from a user terminal Tu. This display request includes a product ID that is an identifier for identifying a product displaying of which is requested by a user and a user ID that is an identifier for identifying the user. The request reception unit 11 outputs the display request received from the user terminal Tu to the purchase-history acquisition unit 13.

The purchase-history storage unit 12 stores therein purchase history information indicating product purchase histories of a user. The purchase history information includes information indicating products that the user purchased in the past. As depicted in FIG. 4, the purchase history information includes a purchase history ID that is an identifier for identifying a purchase history, information (product ID, product name) on a purchased product, and a user ID that is an identifier for identifying a user who purchased the product. The information included in the purchase history information is not limited to the example in FIG. 4, and may include a product category, for example.

The purchase-history acquisition unit 13 identifies a product that a user purchased in the past. When having received input of the display request from the request reception unit 11, the purchase-history acquisition unit 13 acquires a piece of purchase history information that corresponds to the user ID included in the display request from the purchase-history storage unit 12 to identify the product corresponding to the piece of purchase history information. The purchase-history acquisition unit 13 outputs the product ID of the product thus identified to the image extraction unit 16. The purchase-history acquisition unit 13 also outputs the display request to the image extraction unit 16.

The image-information storage unit 14 stores therein image information on product combination images. As depicted in FIG. 5, the image information includes an image ID that is an identifier for identifying an image and product IDs of a plurality of products contained in the image. Explained with the example of the purchase history information depicted in FIG. 4, in the image information of FIG.

5, the image having the image ID "P001" is an image containing coordinates of "shirt A", "watch B", and "shoes B".

The image storage unit 15 stores therein an image ID and image data associated with each other. The image data is data indicating an image showing a scene in which a model is actually using a product. The image information may include the image data and, in this case, the image storage unit 15 can be omitted.

The image extraction unit 16 extracts an image containing the product indicated by the display request and the product identified by the purchase-history acquisition unit 13 from the image-information storage unit 14 and the image storage unit 15. The image extraction unit 16 outputs the image thus extracted to the transmission unit 17. When the image extraction unit 16 extracts a plurality of images, the image extraction unit 16 may transmit the images to the transmission unit 17 or may transmit any one of the images to the transmission unit 17. When an image containing the product indicated by the display request and the product identified by the purchase-history acquisition unit 13 does not exist, the image extraction unit 16 may output a default image that is set in advance for each product to the transmission unit 17. The default image is an image indicating a common combination of a product indicated by the display request and another product.

The following describes an example of image extraction performed by the purchase-history acquisition unit 13 and the image extraction unit 16 with reference to the examples of the purchase history information depicted in FIG. 4 and the image information depicted in FIG. 5. It is assumed that the display request received from the user terminal Tu includes a user ID "U001" and a product ID "M002". In this case, the purchase-history acquisition unit 13 extracts pieces of purchase history information (pieces of purchase history information the purchase history IDs of which are "B001" and "B002") for two records corresponding to the user ID "U001", and identifies the products "shirt A" and "pants A" corresponding to the pieces of purchase history information. The purchase-history acquisition unit 13 outputs the product IDs "M003" and "M004" corresponding to these products to the image extraction unit 16.

The image extraction unit 16 extracts pieces of image information (pieces of image information the image IDs of which are "P001", "P002", and "P003") for three records including the product ID "M002" indicated by the display request and the product ID "M003" or "M004" output by the purchase-history acquisition unit 13. The image extraction unit 16 then extracts three images associated with the product IDs "P001", "P002", and "P003" from the image storage unit 15. The image extraction unit 16 outputs the three images thus extracted to the transmission unit 17.

The transmission unit 17 transmits an image extracted by the image extraction unit 16 to the user terminal Tu. Thus, an image of a combination of a product requested by the user and a product that the user purchased in the past is transmitted to the user terminal Tu.

Operation of the information provision server 10 will be described and also an information provision method according to the present embodiment will be described below with reference to FIG. 6.

Figure 6:
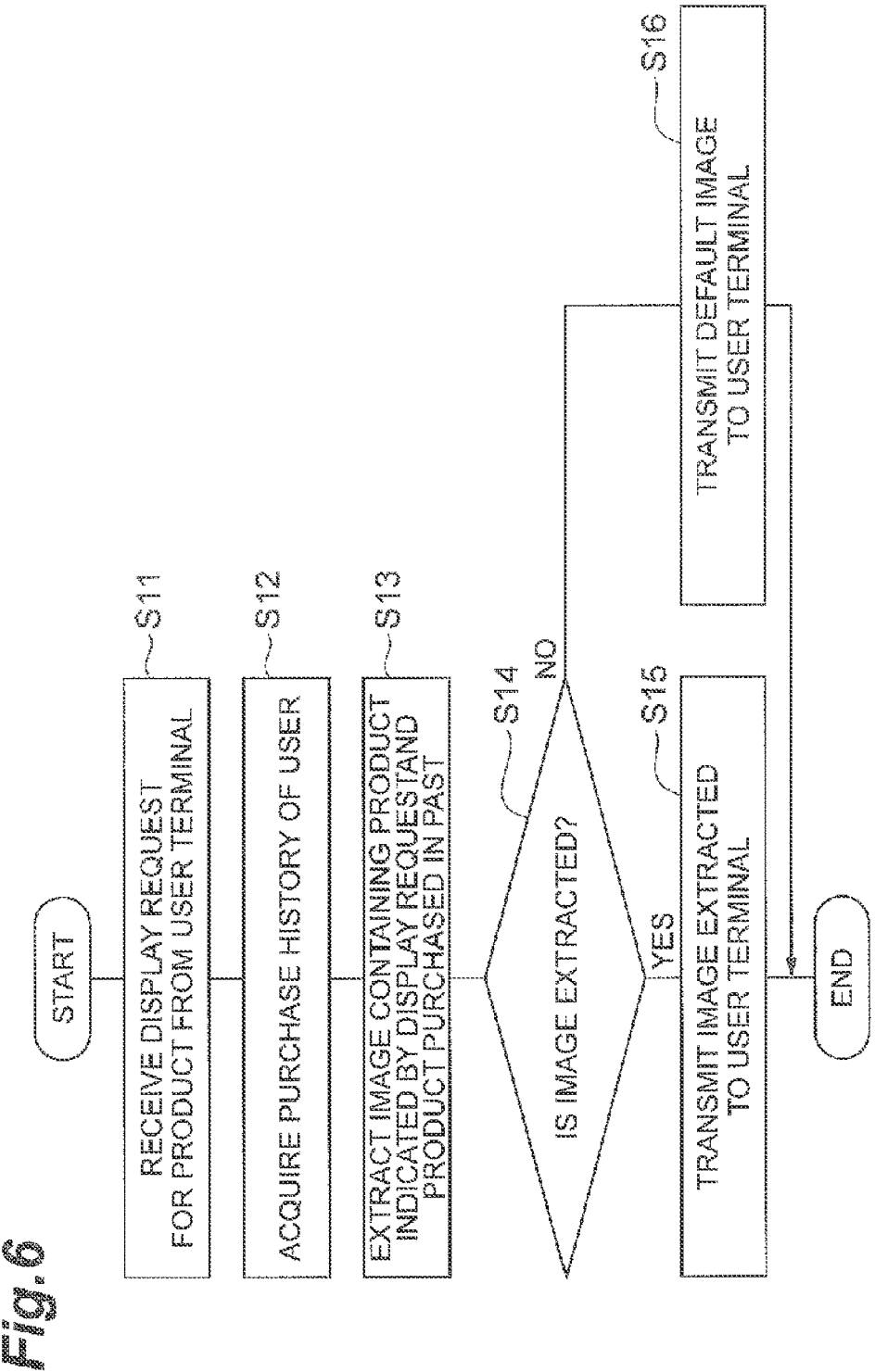
FIG. 6 is a flowchart illustrating an information provision method performed by the information provision server according to the first embodiment.

An image corresponding to the combination of the product requested by the user and the product that the user purchased in the past is provided to the user by performing processes as depicted in FIG. 6. To begin with, the request reception unit 11 receives a display request from a user terminal Tu (step S11, reception step). This display request includes a user ID and a product ID.

Next, the purchase-history acquisition unit 13 acquires purchase history information corresponding to the user ID from the purchase-history storage unit 12 (step S12, access-history acquisition step). Subsequently, the image extraction unit 16 extracts an image containing the product indicated by the display request and the product that the user purchased in the past (step S13, image extraction step).

Subsequently, if the image containing the product indicated by the display request and the product that the user purchased in the past is acquired (YES at step S14), the transmission unit 17 transmits the image to the user terminal Tu (step S15, transmission step). If such an image does not exist (NO at step S14), the transmission unit 17 transmits a default image of the product specified by the user to the user terminal Tu (step S16, transmission step).

Figure 7:
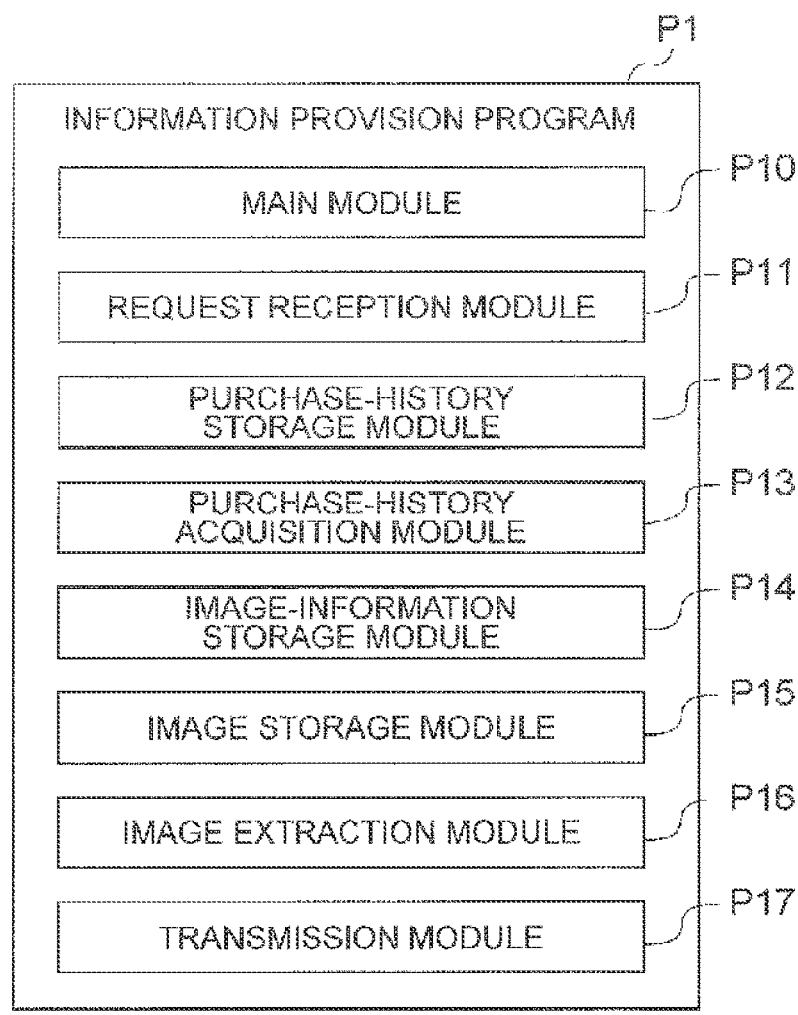
FIG. 7 is a diagram illustrating a structure of an information provision program according to the first embodiment.

An information provision program for causing a computer to function as the information provision server 10 will be described below with reference to FIG. 7.

This information provision program P1 includes a main module P10, a request reception module P11, a purchase-history storage module P12, a purchase-history acquisition module P13, an image-information storage module P14, an image storage module P15, an image extraction module P16, and a transmission module P17.

The main module P10 is a portion for controlling the information providing function in an integrated manner. Functions that are implemented by executing the request reception module P11, the purchase-history storage module P12, the purchase-history acquisition module P13, the image-information storage module P14, the image storage module P15, the image extraction module P16, and the transmission module P17 are the same as the functions of the request reception unit 11, the purchase-history storage unit 12, the purchase-history acquisition unit 13, the image-information storage unit 14, the image storage unit 15, the image extraction unit 16, and the transmission unit 17, respectively.

The information provision program P1 is provided in a state of being recorded in, for example, a recording medium such as CD-ROM or DVD-ROM, or a semiconductor memory. The information provision program P1 may be provided as a computer data signal that is superimposed on a carrier wave via a communication network.

As described above, according to the present embodiment, an image corresponding to a product indicated by the display request and a product identified by the purchase-history acquisition unit 13 is extracted, and the image thus extracted is transmitted to the user terminal Tu. In this manner, the impression when a product in which the user is interested and a product that the user possesses are combined can be presented to the user, so that purchase motivation of the user can be increased.

In an internet shopping site, if a user cannot have an impression when using a product, the user searches around within the site looking for various images, which may increase the load on the server. In contrast, according to the present embodiment, an impression when a product in which the user is interested and a product that the user possesses are combined can be presented to the user, whereby the necessity for the user to search around within the site is reduced, so that the increase of the load on the server can be suppressed.

Second Embodiment

An information provision server 10A according to a second embodiment will be described hereinafter. This information provision server 10A extracts an image posted by another user. Explanations of matters that are the same as or similar to those of the first embodiment are omitted below.

Figure 8:
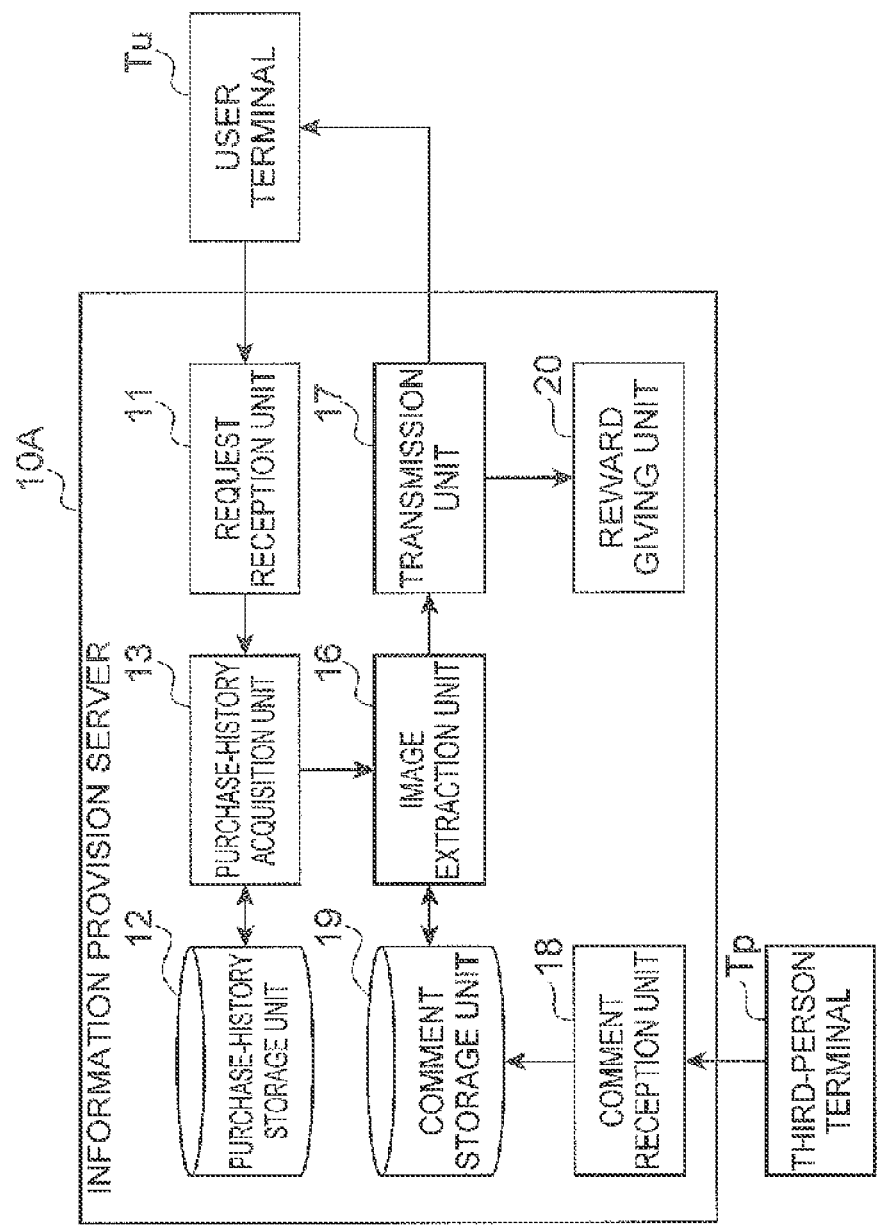
FIG. 8 is a block diagram illustrating a functional structure of an information provision server according to a second embodiment.

As depicted in FIG. 8, the information provision server 10A includes a comment reception unit 18, a comment storage unit (image storage unit) 19, and a reward giving unit 20 instead of the image-information storage unit 14 and the image storage unit 15. In the present embodiment, the image extraction unit 16 extracts an image from the comment storage unit 19. The other components are the same as those of the information provision server 10.

Figure 9:
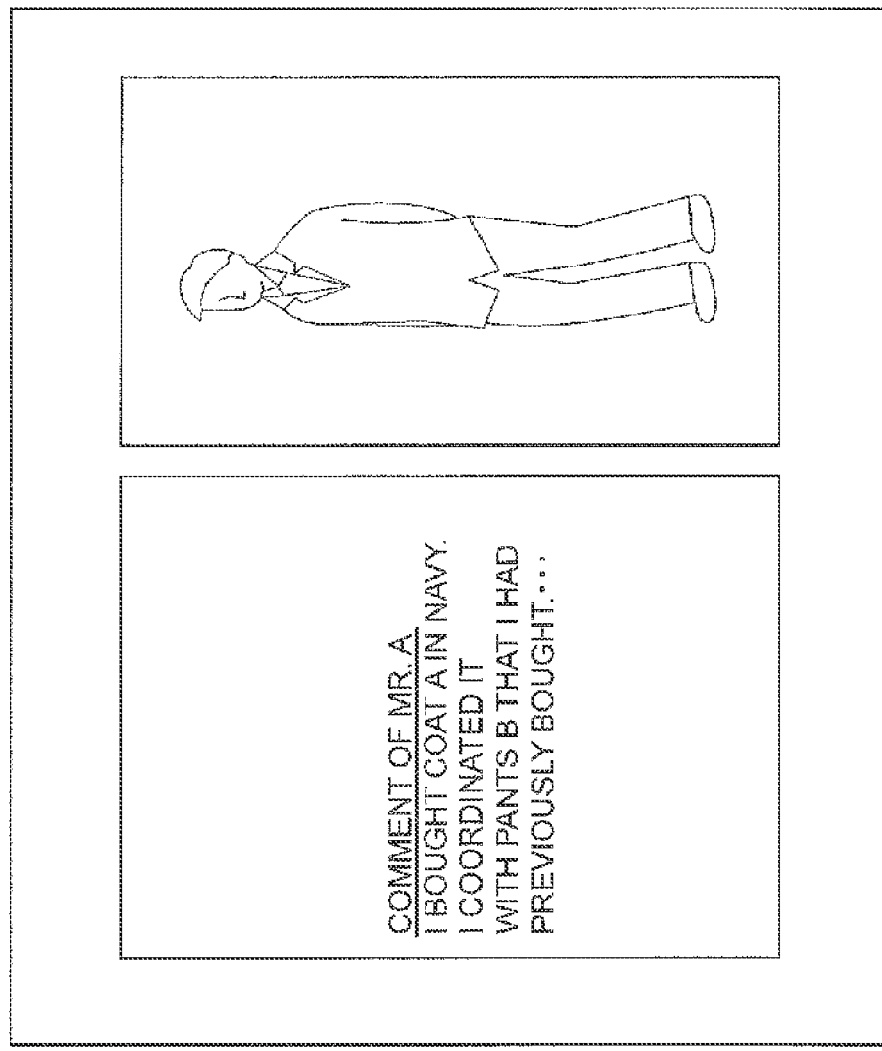
FIG. 9 is a diagram illustrating an example of a comment of a user.

In an online shopping site, as depicted in FIG. 9, functions by which a user can write a review or a comment on a purchased product and an image can be uploaded together with the review and the comment may be provided. The comment reception unit 18 receives an image and text data such as a comment from a user (another user, also referred to as "model user" hereinafter) of a third-person terminal Tp who is different from the user of the user terminal Tu. When having received a comment, for example, from the third-person terminal Tp, the comment reception unit 18 stores comment information including the text data and the image in the comment storage unit 19.

The comment storage unit 19 stores therein comment information received from the comment reception unit 18. As depicted in FIG. 10, the comment information includes a comment ID that is an identifier for identifying a comment, a comment, an image that is uploaded with the comment, a product ID of a product on which the comment is posted, and a user ID of a user who posted the comment. The image uploaded with the comment herein is a product combination image, with which product IDs of a plurality of products are associated.

The reward giving unit 20 gives a certain reward to a model user when an image that was posted by the model user is transmitted to the user terminal Tu. When the image uploaded by the model user is transmitted to the user terminal Tu, the reward giving unit 20 gives the certain reward to the corresponding model user. Conditions for the reward to be given to the model user are not limited to the case that the image is transmitted to the user terminal Tu, and may include a case that the user of the user terminal Tu purchases a product in the presented image.

The image extraction unit 16 extracts an image containing the product indicated by the display request and the product that the user purchased in the past from the comment storage unit 19. The image extraction unit 16 outputs the image thus extracted to the transmission unit 17.

With examples of the purchase history information depicted in FIG. 4 and the comment information depicted in FIG. 10, an example of processing performed by the image extraction unit 16 will be described. It is assumed that the display request received from the user terminal Tu includes a user ID "U003" and the product ID "M002". In this case, the purchase-history acquisition unit 13 extracts a piece of purchase history information, the purchase history ID of which is "B004", corresponding to the user ID "U003", and identifies the product "coat A" corresponding to the piece of purchase history information. The purchase-history acquisition unit 13 outputs the product ID "M005" corresponding to the product to the image extraction unit 16.

The image extraction unit 16 extracts a piece of comment information including the comment ID "C001" that corresponds to the product ID "M002" and the product ID "M005". Subsequently, the image extraction unit 16 extracts the "image A" corresponding to the piece of comment information extracted, and outputs this image to the transmission unit 17.

The transmission unit 17 transmits the "image A" to the user terminal Tu. Thus, the image that is posted by a model user and in which the product requested by the user and the product that the user purchased in the past are coordinated is displayed on the user terminal Tu. After having transmitted the "image A" to the user terminal Tu, the transmission unit 17 outputs a signal indicating transmission completion to the reward giving unit 20. The reward giving unit 20 then gives the certain reward to the model user of a user ID "U004" who posted the "image A".

In the above-described example, product IDs of a plurality of products are associated as comment information in the comment storage unit 19, but the comment information does not necessarily have to include the product IDs. In such a case, the image extraction unit 16 may search a comment section in the comment information for a description on a product name, to use the description as information for identifying a product. For example, the image extraction unit 16 may extract the "image A" on the basis of a description of "coat A" corresponding to a product name in a purchase history in the comment information depicted in FIG. 10 and a description of "watch B" corresponding to the product name in the display request.

In the information provision server 10A according to the present embodiment, effects can be obtained that are the same or similar to those of the above-described information provision server 10. As described above, according to the present embodiment, the comment storage unit 19 stores therein an image that was posted by a user of a third-person terminal Tp who is different from the user of the user terminal Tu. Thus, because the image posted by the user of the third-person terminal Tp can be used as an image to be transmitted to the user, the administrator can save the effort of registering the image in advance.

According to the present embodiment, when an image posted by a model user is transmitted to the user terminal Tu, the certain reward is given to the model user, which can encourage model users to actively post product combination images.

Third Embodiment

An information provision server 10B according to a third embodiment will be described hereinafter. This information provision server 10B extracts an image from a computer system in an external network. Explanations of matters that are the same as or similar to those of the first embodiment are omitted below.

In a system on the internet such as a social networking service (SNS), a function may be provided for a person using the system to write a comment and upload an image on a purchased product. The information provision server 10C extracts an image from such an external site.

Figure 11:
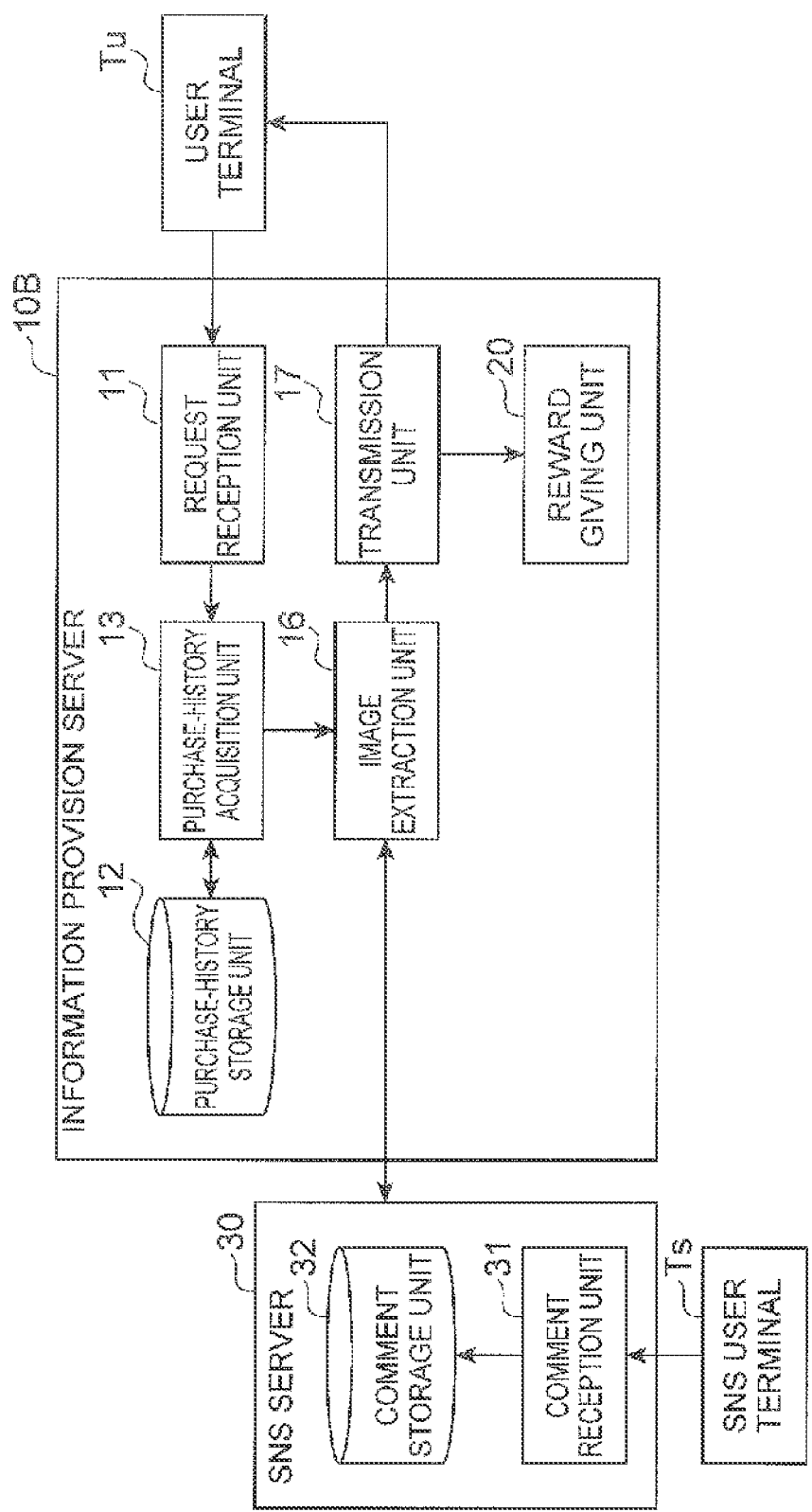
FIG. 11 is a block diagram illustrating a functional structure of an information provision server according to a third embodiment.

As described in FIG. 11, the information provision server 10B does not include the image-information storage unit 14 or the image storage unit 15, and includes the reward giving unit 20. In the present embodiment, the image extraction unit 16 extracts an image from an SNS server 30 that is an external site. The other components are the same as those of the information provision server 10.

The SNS server 30 is one of external sites, and includes a comment reception unit 31 and a comment storage unit 32. The comment reception unit 31 receives an image and text data such as a comment from a user of an SNS user terminal Ts (hereinafter, also referred to as "SNS user") who is a person using the SNS server 30. The comment reception unit 31 stores comment information including the text data and the image in the comment storage unit 32 when having received a comment, for example, from the SNS user terminal Ts. The comment storage unit 32 stores therein the comment information input by the comment reception unit 31.

The image extraction unit 16 refers to the comment storage unit 32 via the communication network N, and extracts an image containing the product indicated by the display request and the product that the user purchased in the past. For example, the image extraction unit 16 searches the comment storage unit 32 for a comment containing product names of the product indicated by the display request and the product that the user purchased in the past, and extracts an image corresponding to the comment. The method of extracting an image from the SNS server 30 performed by the image extraction unit 16 is not limited to the above-described method, and any optional method can be used. For example, when a product ID is stored associated with an image posted by an SNS user, the image may be extracted based on the product ID.

The reward giving unit 20 gives a certain reward to a model user when an image that was posted by an SNS user is transmitted to the user terminal Tu. When the image uploaded by the SNS user is transmitted to the user terminal Tu, the reward giving unit 20 gives the certain reward to the corresponding SNS user. Conditions for the reward to be given to the SNS user are not limited to the case that the image is transmitted to the user terminal Tu, and may include a case that the user of the user terminal Tu purchases a product in a presented image.

In the information provision server 10B according to the present embodiment, effects can be obtained that are the same or similar to those of the above-described information provision server 10. As described in the foregoing, according to the present embodiment, the image extraction unit 16 extracts an image posted by an SNS user. Accordingly, because the image posted by the SNS user can be transmitted to the user, the administrator can save the effort of registering the image in advance.

According to the present embodiment, when an image posted by an SNS user is transmitted to the user terminal Tu, the certain reward is given to the SNS user, which can encourage SNS users to actively post product combination images.

Fourth Embodiment

An information provision server 10C according to a fourth embodiment will be described hereinafter. This information provision server 10C determines whether an extracted image is an image indicating a state of the product being used. Explanations of matters that are the same as or similar to those of the third embodiment are omitted below.

Figure 12:
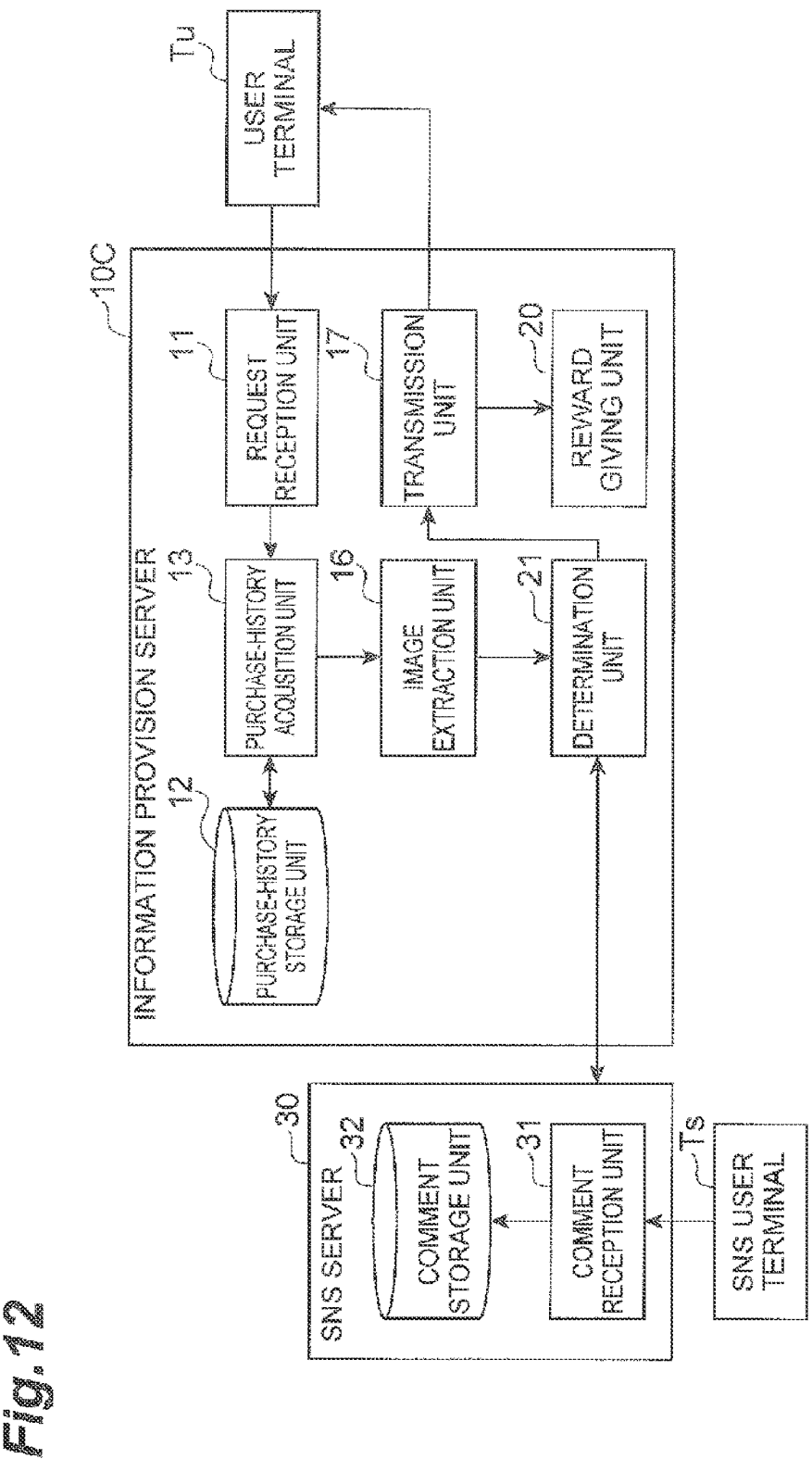
FIG. 12 is a block diagram illustrating a functional structure of an information provision server according to a fourth embodiment.

As depicted in FIG. 12, the information provision server 10C according to the present embodiment further includes a determination unit (first determination unit, second determination unit) 21, and an image extracted by the image extraction unit 16 is output to the determination unit 21. The other components are the same as those of the information provision server 10B in the third embodiment.

The determination unit 21 determines whether an image extracted by the image extraction unit 16 (hereinafter, also referred to as "target image") is an image showing a scene in which a combination of products is used. Because images to be stored in the comment storage unit 32 of the SNS server 30 are images that the SNS user can freely post, some images may not show a scene in which an SNS user uses a combination of products, or may not show the whole of the combination of products. Accordingly, when having determined that the target image is not an image showing a scene in which the combination of products is used, the determination unit 21 prevents the target image from being transmitted to the transmission unit 17. The following describes a method performed by the determination unit 21 to determine whether the image is an image showing a scene in which the combination of products is used.

The determination unit 21 calculates a feature amount indicating features of the target image when the target image is input by the image extraction unit 16. The determination unit 21 also calculates the feature amount of an image (hereinafter, also referred to as "comparative image") indicating a scene in which the same combination of products as in the target image is used. The comparative image herein may be a default image. The determination unit 21 then compares the feature amount of the target image with the feature amount of the comparative image to determine the degree of similarity between both images. If the degree of similarity between both images is within a certain range, the determination unit 21 outputs the target image to the transmission unit 17. If the degree of similarity between both images is not within the certain range, the determination unit 21 discards the target image without outputting it to the transmission unit 17. This allows only an image that is assumed to be an image showing a scene in which the combination of products is used to be transmitted to the user terminal Tu, while preventing an image that is not assumed to be an image showing a scene in which the combination of products is used from being transmitted to the user terminal Tu. When discarding the target image, the determination unit 21 may output a default image associated with the product to the transmission unit instead of the target image. This can prevent a situation in which no image is transmitted to the user terminal Tu.

Alternatively, the determination unit 21 may determine whether to transmit the target image to the transmission unit 17 on the basis of a proportion for which a product combination image accounts in the target image. For example, the determination unit 21 sets a plurality of feature points in advance for an image showing each product (hereinafter, referred to as "reference image") and, based on the number of feature points contained in the target image, determines whether the whole of the combination of products is shown in the target image. In this case, when having determined that the whole of the combination of products is shown in the target image, the determination unit 21 outputs the target image to the transmission unit 17. When having determined that the whole of the combination of products is not shown in the target image, the determination unit 21 discards the target image without outputting it to the transmission unit 17. This allows only an image showing the whole of the combination of products to be transmitted to the user terminal Tu, and thus an image not showing the whole of the combination of products can be prevented from being transmitted to the user terminal Tu. The reference image is preferably an image the background of which is plain.

Alternatively, the determination unit 21 may determine whether feature points of a first reference image showing the product indicated by the display request exist at a certain proportion or more in an image posted by an SNS user and also feature points of a second reference image showing the product identified by the purchase-history acquisition unit 13 are contained at the certain proportion or more in the image posted by the SNS user. Now, it is assumed that the target image is an image of a combination of a top and a bottom. For example, when the feature points of a reference image for the top (first reference image) are contained in the target image at the certain proportion or more and also the feature points of a reference image for the bottom (second reference image) are contained in the target image at the certain proportion or more, the determination unit 21 can determine that the respective coordinated products are shown in the target image. If having determined that the target image shows the respective coordinated products, the determination unit 21 outputs the target image to the transmission unit 17. If this is not the case, the determination unit 21 discards the target image without outputting it to the transmission unit 17. This can prevent an image not showing the whole of the combined products from being transmitted.

Alternatively, the determination unit 21 may determines that the target image is an image showing a scene in which the products are worn when feature points contained in the target image are dispersed over the whole of a certain range in the image. The certain area herein is an area that is determined, for example, based on a category of a product such as tops or bottoms. This area can be set in the upper part of the image when the product falls under tops, can be set in the lower part of the image when the product falls under bottoms, and can be set in the whole part of the image when the product falls under one-piece suits. In this case, the comment storage unit 32 is required to store therein categories of products. When the area of feature points of each reference image contained in the target image is larger than the certain area, the determination unit 21 determines that the feature points are dispersed over the whole of the certain area. Now, it is assumed that the target image is an image of a combination of a top and a bottom. For example, when feature points for the top are dispersed in the upper part of the image and feature points for the bottom are dispersed in the lower part of the image, the determination unit 21 determines that the target image is an image showing a scene in which the products are worn. If having determined that the target image is an image showing a scene in which the products are worn, the determination unit 21 outputs the target image to the transmission unit 17. If this is not the case, the determination unit 21 discards the target image without outputting it to the transmission unit 17. This can prevent a target image that is not an image showing a scene in which the products are worn from being transmitted.

When the target image does not contain feature points of a reference image at the certain proportion or more, the target image is more likely to be a magnified image showing part of the product, or picture quality of the target image is more likely to be poor. When the feature points of the target image are not dispersed in the upper part or the lower part of the target image depending on the category of the product, the target image is more likely to be an image that shows the product on a small scale although showing the whole of the product, or to be an image in which the product is not worn. Thus, with the determination unit 21 as described above, an image showing a close-up of part of the product, an image showing the product on a small scale, or an image that is not an image in which the product is worn can be prevented from being transmitted to the user, whereby an image that is more likely to be an image in which a model wears the product and is easily viewable can be selectively transmitted.

Alternatively, the determination unit 21 may use color histogram matching to determine whether the target image is similar to the comparative image. In this case, when the color histogram of the target image is similar to that of the comparative image, the determination unit 21 can determine that the target image is an image in which the product is worn. When color histogram matching is performed, a histogram in which the abscissa indicates a parameter (e.g., gray scale (=RGB/3)) representing a color and the ordinate indicates the number of pixels of a respective image is prepared for each of the target image and the comparative image. When the shape of the histogram of the target image is similar to that of the comparative image, the determination unit 21 determines that the target image is similar to the comparative image. This is because it is expected that the target image is more likely to show the same product as in the comparative image, in the same size, when the shape of the histogram of the target image is similar to that of the comparative image.

The determination unit 21 may extract an image showing the whole of the product or an image that is easily viewable, as described below. To begin with, when a certain number of target images posted by SNS users have accumulated, the determination unit 21 compares the target images with each other to classify them into groups of similar images. As a method for determining whether the images are similar to each other herein, any optional method can be used such as the method based on the number of feature points or the method using color histograms as described above. Subsequently, among the target images, the determination unit 21 excludes images that were not classified into groups each containing a plurality of target images. For example, when ten target images exist, five of the target images belong to a first group, three of the target images belong to a second group, one of the target images belongs to a third group, and the remaining one of the target images belongs to a fourth group, the determination unit 21 excludes the two images belonging to the third group and the fourth group (i.e., each does not belong to a same group together with another target image). By such a determination method, determination can be made without using a comparative image. When a plurality of images are extracted, the determination unit 21 outputs the target images to the transmission unit 17 so that a target image having a larger image size will be displayed in a higher level. Alternatively, the determination unit 21 may transmit the target images to the transmission unit 17 so that target images containing a larger proportion of feature points will be displayed in a higher level.

In the information provision server 10C according to the present embodiment also, effects can be obtained that are the same or similar to those of the above-described information provision server 10B. With the information provision server 10C, only an image showing a scene in which products are used in combination, which is information useful for the user to purchase the products, can be transmitted to the user terminal Tu.

Fifth Embodiment

An information provision server 10D according to a fifth embodiment will be described hereinafter. This information provision server 10D extracts an image on the basis of physical characteristics of the user. Explanations of matters that are the same as or similar to those of the first embodiment are omitted below.

Figure 13:
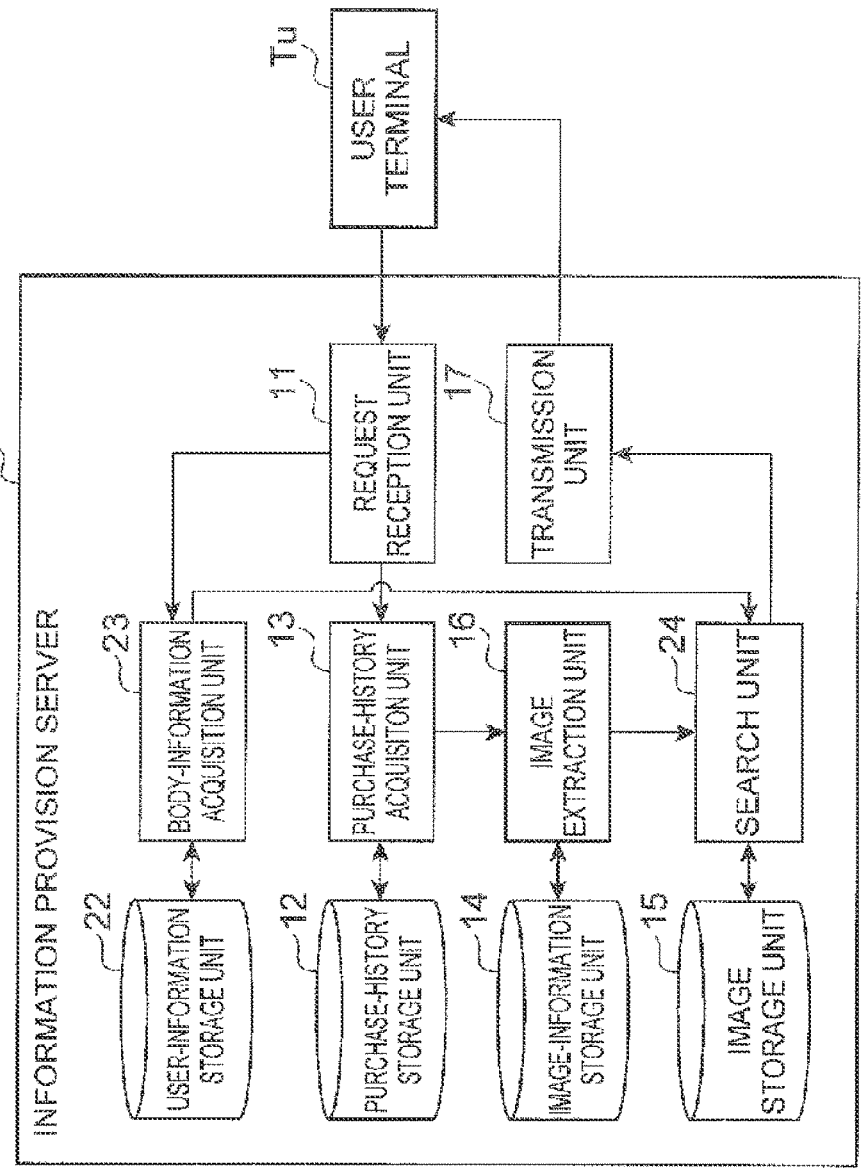
FIG. 13 is a block diagram illustrating a functional structure of an information provision server according to a fifth embodiment.

As depicted in FIG. 13, the information provision server 10D of the present embodiment further includes a user-information storage unit 22, a body-information acquisition unit 23, and a search unit 24, and the request reception unit 11 outputs the display request from the user terminal Tu also to the body-information acquisition unit 23. The image-information storage unit 14 contains information indicating physical characteristics. The other components are the same as those of the information server 10 of the first embodiment. In the present embodiment, the image extraction unit 16 and the search unit 24 correspond to the image extraction unit in the claims.

The user-information storage unit 22 stores therein user information on a user. The user information includes a user ID and user body information indicating physical characteristics of the user. In the example depicted in FIG. 14, height, weight, and sex of users correspond to the user body information. These pieces of the user body information are registered in advance by a user of each user terminal Tu. The user body information herein may include user's measurements such as chest circumference, waist circumference, and hip circumference and information such as age, skin color, and race in addition to height, weight, and sex.

The body-information acquisition unit 23 acquires the user body information. When having received an input of a display request from the request reception unit 11, the body-information acquisition unit 23 acquires user body information corresponding to the user ID included in the display request from the user-information storage unit 22. The body-information acquisition unit 23 outputs the user body information thus acquired to the search unit 24.

As depicted in FIG. 15, the image-information storage unit 14 stores, as image information, an image ID and product IDs of a plurality of products contained in the image, and further height, weight, and sex of a model shown in the image. The model herein is a person who is using a combination of products as an object in an image showing a scene in which the products are actually used. For example, when products to be sold are garments, a person who is shown in a state of wearing a combination of the garments in an image is a model. In this example, height, weight, and sex of the model are pieces of model body information indicating physical characteristics of the model. These pieces of the model body information are registered in advance by an administrator of the information provision server 10. The model body information may include model's measurements such as chest circumference, waist circumference, and hip circumference, and information such as age, skin color, and race in addition to the above-described items.

The image extraction unit 16 extracts pieces of image information corresponding to images containing the product indicated by the display request and the product identified by the purchase-history acquisition unit 13. The image extraction unit 16 outputs the pieces of image information thus extracted to the search unit 24.

The search unit 24 searches a piece of image information corresponding to the user body information from the pieces of image information extracted by the image extraction unit 16, and extracts an image indicated by the image ID of the piece of image information thus searched from the image storage unit 15. The piece of image information corresponding to the user body information is a piece of image information that includes model body information that is similar to the user body information. With reference to the examples of the purchase history information depicted in FIG. 4, the user information depicted in FIG. 14, and the image information depicted in FIG. 15, an example of image extraction performed by the information provision server 10D will be described below.

It is assumed that the display request received from the user terminal Tu includes the user ID "U001" and the product ID "M002". In this case, the purchase-history acquisition unit 13 extracts pieces of purchase history information (pieces of purchase history information the purchase history IDs of which are "B001" and "B002") for two records corresponding to the user ID "U001", and identifies the products "shirt A" and "pants A" corresponding to the pieces of purchase history information. The purchase-history acquisition unit 13 outputs the product IDs "M003" and "M004" corresponding to these products to the image extraction unit 16. The body-information acquisition unit 23 outputs the height "185 (cm)" and the weight "65 (kg)" as user body information corresponding to the user ID "U001" to the search unit 24.

The image extraction unit 16 extracts pieces of image information (pieces of image information the image IDs of which are "P001", "P002", and "P003") for three records that include the product ID "M002" indicated by the display request and the product ID "M003" or "M004" output by the purchase-history acquisition unit 13. The image extraction unit 16 outputs the three pieces of image information thus extracted to the search unit 24.

Among the three pieces of image information input by the image extraction unit 16, the search unit 24 extracts pieces of image information that include model body information in which the difference in height from the user is within a certain range. Subsequently, among the pieces of image information thus extracted, the search unit 24 extracts a piece of image information that includes model body information in which the weight is the closest to that of the user body information. For example, assuming that the certain range for height is five centimeters, the search unit 24 extracts two pieces of image information the image IDs of which are "P001" and "P002", in which the difference from the height "185 (cm)" of the user is within five centimeters. Subsequently, the search unit 24 extracts a piece of image information the image ID of which is "P002", which corresponds to the model body information in which the weight is the closest to the weight "65 (kg)" of the user. The search unit 24 then extracts an image associated with the image ID "P002" from the image storage unit 15.

The search unit 24 outputs the image thus extracted to the transmission unit 17. If any piece of image information that contains model body information that is similar to the user body information does not exist, the search unit 24 may output a default image that is set in advance for each product to the transmission unit 17. The default image is, for example, an image showing a scene in which a model in an average body shape is using the combination of products.

The above-described method for image extraction performed by the search unit 24 is one example, and a criterion for determining that the user body information is similar to the model body information may be optionally determined. For example, the search unit 24 may use body information other than the height and weight of the user to extract image information. For example, the search unit 24 may use the same sex or race as a criterion for extracting image information.

In the information provision server 10D according to the present embodiment also, effects can be obtained that are the same or similar to those of the above-described information provision server 10. In the present embodiment, an image is extracted that corresponds to the product indicated by the display request, the product that the user purchased in the past, and the physical characteristics of the user. By transmitting such an image corresponding to the physical characteristics of the user to the user terminal Tu, an impression when the user uses products in combination can be presented to the user, so that purchase motivation of the user can be increased.

In the foregoing, the present invention has been described in detail based on the embodiments. However, the present invention is not limited to the above-described embodiments. The present invention can be variously modified without departing from the scope thereof.

For example, the information provision servers 10 to 10D may be modified as follows. In the above-described embodiments, the image extraction unit 16 extracts an image containing the product indicated by the display request and the product identified by the purchase-history acquisition unit 13. However, the image extraction unit 16 may extract an image containing the product indicated by the display request and the product identified by the purchase-history acquisition unit 13 and also extract an image that contains the product indicated by the display request but does not contain the product identified by the purchase-history acquisition unit 13, and may transmit the respective images thus extracted to the transmission unit 17. In this case, the transmission unit 17 may transmit these images to the user terminal Tu so that the image containing the product indicated by the display request and the product identified by the purchase-history acquisition unit 13 is displayed in a higher level than the image that contains the product indicated by the display request but does not contain the product identified by the purchase-history acquisition unit 13. This can preferentially display the image of a combination of the products in which the user is interested.

When the image extraction unit 16 extracts a plurality of images containing the product indicated by the display request and the product identified by the purchase-history acquisition unit 13, the transmission unit 17 may transmit an image in which the product identified by the purchase-history acquisition unit 13 falls under tops or bottoms, out of the extracted images, to the user terminal Tu so that the image will be displayed in a higher level than an image in which the product identified by the purchase-history acquisition unit 13 falls under watches or accessories. In this case, it is preferable that product categories (e.g., tops, bottoms, watches, accessories, etc.) be stored in association with product IDs in the image information and that priorities be set for the respective categories. For example, a priority for accessories such as a watch may be set to be lower than those for tops and bottoms. The reason why the priority for watches or accessories, for example, is set lower than those for tops and bottoms is because images of watches or accessories are less visible than images of tops or bottoms, and are accordingly considered to make weaker impressions on the user. According to such a mode, an image in which the product identified by the purchase-history acquisition unit 13 is combined with a product that gives a visually strong impression such as a top or a bottom, is displayed in a higher level, whereby more useful information can be displayed at an easily visible position.

Alternatively, when the image extraction unit 16 extracts a plurality of images containing the product indicated by the display request and the product identified by the purchase-history acquisition unit 13, the transmission unit 17 may transmits an image of a combination of products the purchased quantity of which is larger to the user terminal Tu so that the image will be displayed in a higher level. This purchased quantity can be obtained by extracting purchase histories of other users from the purchase-history storage unit 12 and counting the number of users who purchased a plurality of products contained in a product combination image. In this manner, an image of product combination that is popular with other users is displayed in a higher level, whereby information useful for the user can be displayed at an easily visible position, so that purchase motivation of the user can be increased.

In the above-described examples, the transmission unit 17 allows displaying an image extracted by the image extraction unit 16 in a higher level so that the extracted image can be conspicuously displayed. However, the transmission unit 17 may allow displaying an image in a larger size or highlighting the image, thereby displaying the extracted image conspicuously.

In the above-described embodiments, the information provision servers 10 to 10D each extract an image containing a product that the user purchased in the past based on the purchase history, but the information provision servers 10 to 10D each may extract an image containing a product that the user viewed in the past based on the browsing history of the user. In this case, the information provision servers 10 to 10D each need to include a browsing-history storage unit that stores therein browsing records of the user instead of the purchase-history storage unit 12.

The information provision servers 10 to 10D each may include a notification unit that notifies the user of information on an image containing the product indicated by the display request and a product that the user accessed in the past when the image has been added into the image-information storage unit 14, the comment storage unit 19, or the comment storage unit 32, for example. In this case, when image information on the image containing the product indicated by the display request from the user of the user terminal Tu and the product that the user accessed in the past has been added into the image-information storage unit 14 by the administrator, the notification unit transmits to the user terminal Tu information indicating that an image of product combination in which the user is interested has been added. Furthermore, when the comment reception unit 18 or the comment reception unit 31 has received an image containing the product indicated by the display request from the user of the user terminal Tu and the product the user accessed in the past from a third-person terminal Tp or an SNS user terminal Ts, and the image has been stored in the comment storage unit 19 or the comment storage unit 32, the notification unit transmits to the user terminal Tu information indicating that an image of product combination in which the user is interested has been added.

The notification unit may notify the user of information on the added image by e-mail, or may notify the user of the information on a Web page when the user accesses the shopping site again. The notification unit can inform the user of the information at any optional timing. Alternatively, when a request for a page in the shopping site is received from the user terminal Tu, the notification unit may transmit information on the Web page so that the image that was newly added to the page is displayed. Alternatively, when the user accesses another Web site, the notification unit may allow displaying an image of the added product in an advertising section on the other Web site. This enables the user to refer to the added image, and thus the motivation of the user to purchase the product is increased.

In the first to the fifth embodiments, the information provision servers 10 to 10D each include a plurality of storage units, but these storage units may be provided to a server other than the information provision server 10. Furthermore, these storage units may be integrated into one, or one storage unit may be distributed to function as a plurality of storage units.

The functions of the information provision servers of the first to the fifth embodiments may be optionally combined. For example, when the functions of the information provision servers of the first embodiment and the second embodiment are combined, the image extraction unit 16 extracts images from the image-information storage unit 14, the image storage unit 15, and the comment storage unit 19. This allows images to be extracted from both of an image registered in the image-information storage unit and the image storage unit 15 by an administrator and an image posted by a model user, and the images can be presented to the user. Alternatively, when the functions of the information provision servers of the first embodiment and the third embodiment are combined, the image extraction unit 16 extracts images from the image-information storage unit 14, the image storage unit 15, and the SNS server 30. This allows images to be extracted from both of an image registered in the image-information storage unit and the image storage unit 15 by an administrator and an image posted by an SNS user, and the images can be presented to the user. Alternatively, for example, the determination unit 21 described in the information provision server 10C may be provided to the information provision servers 10 to 10B, and 10D.

The image extraction source of the image extraction unit 16 in the third embodiment is not limited to the SNS server, and may be an optional external server providing a blog or other services. The information provision servers 10A to 10C do not necessarily have to include the reward giving unit 20. Furthermore, the above-described embodiments have been described on the assumption that the display request includes one product ID, but the display request may include a plurality of product IDs. The display request may also be a query indicating search criteria. The search criteria herein include product categories (tops, bottoms, etc.) and various keywords. When the display request is a query, the image extraction unit 16 extracts an image that contains a product satisfying the search criteria and a product identified by the purchase-history acquisition unit 13 from the image storage unit 15, the comment storage unit 19, or the comment storage unit 32. The image extraction unit 16 also extracts an image that contains the product satisfying the search criteria but does not contain the product identified by the purchase-history acquisition unit 13. The image that contains the product satisfying the search criteria and the product identified by the purchase-history acquisition unit 13 may be displayed on the user terminal Tu more conspicuously than the image that contains the product satisfying the search criteria but does not contain the product identified by the purchase-history acquisition unit 13.

REFERENCE SIGNS LIST

10A, 10B, 10C . . . information provision server, 11 . . . request reception unit, 12 . . . purchase-history storage unit, 13 . . . purchase-history acquisition unit, 14 . . . image-information storage unit, 15 . . . image storage unit, 16 . . . image extraction unit, 17 . . . transmission unit, 18 . . . comment reception unit, 19 . . . comment storage unit, 20 . . . reward giving unit, 21 . . . determination unit, 22 . . . user-information storage unit, 23 . . . body-information acquisition unit, 24 . . . search unit, 30 . . . SNS server, 31 . . . comment reception unit, 32 . . . comment storage unit, P1 . . . information provision program, P10 . . . main module, P11 . . . request reception module, P12 . . . purchase-history storage module, P13 . . . purchase-history acquisition module, P14 . . . image-information storage module, P15 . . . image storage module, P16 . . . image extraction module, P17 . . . transmission module

The invention claimed is:

1. An information provision device comprising:
at least one memory operable to store program code; and
at least one processor operable to read the program code and operate as instructed by the program code, to perform:
receiving a display request including a first product ID and a user ID from a terminal of a user;
referring to an access-history storage that stores therein an access history indicating a purchase history or a viewing history of a product, and identifying a second product ID of a product that the user has ever purchased or viewed based on the user ID included in the display request;
searching a comment storage, of an external server, that stores therein a plurality of pieces of comment information each including text data and an image associated with each other, the text data and the image being related to a product on which comment is made, the plurality of pieces of comment information having been received from at least one another user who accesses an external internet site of the external server;
in response to the plurality of comment information being associated with a product ID of the product on which the comment is made, determining a first piece of comment information that is associated with the first product ID included in the display request and the second product ID of the product identified as having been purchased or viewed by the user, extracting a first image included in the first piece of comment information, and transmitting the extracted first image to the terminal to display the first image on the terminal; and
in response to the plurality of comment information not being associated with the product ID of the product on which the comment is made, determining a second piece of comment information that includes a description of products corresponding to the first product ID and the second product ID, based on text data of the second piece of comment information, extracting a second image included in the second piece of comment information, and transmitting the extracted second image to the terminal to display the second image on the terminal.

2. The information provision device according to claim 1, wherein the at least one processor further operates as instructed by the program code to perform:
extracting, from an image storage that stores therein a plurality of records each associating product IDs of a plurality of products and an image ID identifying a product combination image showing an image of the plurality of products with each other, a record including the first product ID included in the display request and the second product ID of the product identified as having been purchased or viewed by the user;
extracting from the image storage another image that shows an image of the product identified by the display request but does not show an image of the product identified as having been purchased or viewed by the user, and
the product combination image that shows the image of the product identified by the display request and the image of the product identified as having been purchased or viewed by the user is displayed on the terminal more conspicuously than the another image that shows the image of the product identified by the display request but does not show the image of the product identified as having been purchased or viewed by the user.

3. The information provision device according to claim 1, wherein
extracting, from an image storage that stores therein a plurality of records each associating product IDs of a plurality of products and an image ID identifying a product combination image showing an image of the plurality of products with each other, a record including the first product ID included in the display request and the second product ID of the product identified as having been purchased or viewed by the user;
the display request is a query indicating a search criterion for a product,
the extracting from the image storage further comprises extracting from the image storage another image that shows an image of a product satisfying the search criterion but does not show an image of the product identified as having been purchased or viewed by the user, and
an image showing therein the image of the product satisfying the search criterion and the image of the product identified as having been purchased or viewed by the user is displayed on the terminal more conspicuously than the another image that shows the image of the product satisfying the search criterion but does not show the image of the product identified as having been purchased or viewed by the user.

4. The information provision device according to claim 1, wherein the at least one processor further operates as instructed by the program code to perform providing a certain reward to the at least one another user when the user who has viewed the image that was posted by the at least one another user purchases the product.

5. The information provision device according to claim 1, wherein the at least one processor further operates as instructed by the program code to perform:
extracting, from an image storage that stores therein a plurality of records each associating product IDs of a plurality of products and an image ID identifying a product combination image showing an image of the plurality of products with each other, a record including the first product ID included in the display request and the second product ID of the product identified as having been purchased or viewed by the user; and
notifying the user of information on the product combination image showing therein an image of the product identified by the display request and an image of the product identified as having been purchased or viewed by the user when the image has been added into the image storage.

6. The information provision device according to claim 1, wherein the at least one processor further operates as instructed by the program code to perform determining whether the image posted by the at least one another user is a wearing-scene image showing a scene in which a given person wears a combination of products, wherein
in response to determining that the image posted by the at least one another user is not the wearing-scene image, the transmitting does not transmit the image posted by the at least one another user to the terminal.

7. The information provision device according to claim 1, wherein the at least one processor further operates as instructed by the program code to perform determining whether feature points of a first reference image showing an image of the product identified by the display request exist in the image posted by the at least one another user at a certain proportion or more and also feature points of a second reference image showing an image of the product identified as having been purchased or viewed by the user exist in the image posted at the certain proportion or more, wherein
in response to determining that respective feature points of the first reference image and the second reference image do not exist in the image posted by the at least one another user at the certain proportion or more, the transmitting does not transmit the image posted by the at least one another user to the terminal.

8. The information provision device according to claim 1, wherein the at least one processor further operates as instructed by the program code to perform:
extracting, from an image storage that stores therein a plurality of records each associating product IDs of a plurality of products and an image ID identifying a product combination image showing an image of the plurality of products with each other, a record including the first product ID included in the display request and the second product ID of the product identified as having been purchased or viewed by the user, and
when the product combination image showing therein the image of the product identified by the display request and the image of the product identified as having been purchased or viewed by the user does not exist, the extracting from the image storage comprises extracting a default image that is set for the product identified by the display request.

9. The information provision device according to claim 1, wherein the at least one processor further operates as instructed by the program code to perform:
extracting, from an image storage that stores therein a plurality of records each associating product IDs of a plurality of products and an image ID identifying a product combination image showing an image of the plurality of products with each other, a record including the first product ID included in the display request and the second product ID of the product identified as having been purchased or viewed by the user; and
acquiring physical characteristics of the user, wherein
the image storage stores therein an image containing information on the physical characteristics of the user, and
the extracting from the image storage comprises extracting from the image storage a product combination showing therein an image of the product identified by the display request and an image of the product identified as having been purchased or viewed by the user and corresponds to the physical characteristics of the user.

10. A computer-implemented information provision method comprising:
receiving a display request including a first product ID and a user ID from a terminal of a user;
referring to an access-history storage that stores therein an access history indicating a purchase history or a viewing history of a product, and identifying a second product ID of a product that the user has ever purchased or viewed based on the user ID included in the display request;
searching a comment storage, of an external server, that stores therein a plurality of comment information each including text data and an image associated with each other, the text data and the image being related to a product on which comment is made, the plurality of pieces of the comment information having been received from at least one another user who accesses an external internet site of the external server;

in response to the plurality of comment information being associated with a product ID of the product on which the comment is made, determining a first piece of comment information that is associated with the first product ID included in the display request and the second product ID of the product identified as having been purchased or viewed by the user, extracting a first image included in the first piece of comment information, and transmitting the extracted first image to the terminal to display the first image on the terminal; and in response to the plurality of comment information not being associated with the product ID of the product on which the comment is made, determining a second piece of comment information that includes a description of products corresponding to the first product ID and the second product ID, based on text data of the second piece of comment information, extracting a second image included in the second piece of comment information, and transmitting the extracted second image to the terminal to display the second image on the terminal.

11. The information provision device according to claim 1, wherein the extracting the image further comprises acquiring a plurality of images included in a plurality of first pieces of comment information and/or a plurality of second pieces of comment information, classifying the plurality of images into a plurality of groups based on similarity among the plurality of images, extracting a group, to which a predetermined number or less of an image belongs, from the plurality of groups, and excluding the predetermined number or less of the image belonging to the extracted group from the extracted image to be transmitted to the terminal.

12. The information provision device according to claim 1, wherein the classifying the plurality of images comprises:
  determining the similarity among the plurality of images based on whether feature points included in a first image of the plurality of images exist at a certain proportion or more in a second image of the plurality of images; and
  classifying the first image and the second image into the same group in response to determining that the certain proportion or more of the feature points included in the first image exist in the second image.

13. The information provision device according to claim 1, wherein the classifying the plurality of images comprises:
  determining the similarity among the plurality of images based on whether a color histogram of a first image of the plurality of images matches with a color histogram of a second image of the plurality of images; and
  classifying the first image and the second image into the same group in response to determining that the color histogram of the first image matches with the color histogram of the second image.

* * * * *